(12) United States Patent
Kolnik et al.

(10) Patent No.: US 12,715,383 B2
(45) Date of Patent: Aug. 25, 2026

(54) BUMPER BODY-PART ASSEMBLY AND A MOTOR VEHICLE

(71) Applicant: Dr. Ing. h.c. F. Porsche Aktiengesellschaft, Stuttgart (DE)

(72) Inventors: Stefan Kolnik, Stuttgart (DE); Christian Baumbach, Weil der Stadt (DE); Anne-Kathrin Zeile, Stuttgart (DE); Herbert Klamser, Korntal-Muenchingen (DE); Yue Wan, Leonberg (DE); Thomas Dittus, Heimsheim (DE); Stephan Ebinger, Waldenbuch (DE); Ardi Shehu, Wezemaal (BE); Kurt Vandijck, Wezemaal (BE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 358 days.

(21) Appl. No.: 18/493,814

(22) Filed: Oct. 25, 2023

(65) Prior Publication Data

US 2024/0140339 A1 May 2, 2024

(30) Foreign Application Priority Data

Oct. 28, 2022 (DE) ..................... 10 2022 128 735.1

(51) Int. Cl.

| | |
|---|---|
| ***B60R 19/48*** | (2006.01) |
| ***B60R 11/02*** | (2006.01) |
| *B60R 11/00* | (2006.01) |
| *B60R 19/18* | (2006.01) |

(52) U.S. Cl.
CPC .......... *B60R 19/48* (2013.01); *B60R 11/0217* (2013.01); *B60R 2011/004* (2013.01); *B60R 2019/1866* (2013.01)

(58) Field of Classification Search
CPC .............. B60R 2019/186; B60R 19/48; B60R 11/0217; B60R 11/0223; B60Q 5/008
USPC .......................................................... 293/117
See application file for complete search history.

(56) References Cited

U.S. PATENT DOCUMENTS

| | | | | |
|---|---|---|---|---|
| 9,517,740 | B2 * | 12/2016 | Okuyama | B60R 11/0217 |
| 9,731,554 | B2 * | 8/2017 | Kim | H04R 1/026 |
| 9,764,687 | B2 * | 9/2017 | Okuyama | H04R 1/2811 |
| 10,315,595 | B2 * | 6/2019 | Keller | B60R 19/36 |
| 10,889,251 | B2 * | 1/2021 | Jackson | B60Q 5/008 |
| 11,912,196 | B2 * | 2/2024 | Kim | B60Q 5/008 |
| 12,109,945 | B2 * | 10/2024 | Kim | B60R 19/52 |

(Continued)

FOREIGN PATENT DOCUMENTS

| | | | | |
|---|---|---|---|---|
| CN | 118306320 A * | 7/2024 | | B60R 11/0217 |
| DE | 102015016945 A1 | 7/2016 | | |

(Continued)

*Primary Examiner* — Jason S Morrow
(74) *Attorney, Agent, or Firm* — LEYDIG, VOIT & MAYER, LTD.

(57) ABSTRACT

A bumper body-part assembly, including a cavity at least partially enclosed by a bumper member and a body part and a sound generator assembly at least partially arranged in the cavity. The sound generator assembly includes a housing assembly with at least one speaker, an electronic assembly and a fastener. The housing assembly includes a deformation assembly arranged in the cavity.

20 Claims, 5 Drawing Sheets

(56) References Cited

U.S. PATENT DOCUMENTS

| | | | | |
|---|---|---|---|---|
| 2017/0106787 | A1 | 4/2017 | Kim | |
| 2023/0095260 | A1* | 3/2023 | Tanaka | B60R 13/04<br>381/86 |
| 2024/0051482 | A1* | 2/2024 | Bader | B60R 19/023 |
| 2024/0406615 | A1* | 12/2024 | Hayakawa | H04R 1/28 |

FOREIGN PATENT DOCUMENTS

| | | | | | |
|---|---|---|---|---|---|
| DE | 102020002996 | A1 | | 8/2020 | |
| JP | 2019166980 | A | | 10/2019 | |
| KR | 20160003500 | A | * | 1/2016 | B60Q 5/008 |
| KR | 20190048678 | A | * | 5/2019 | B60R 19/03 |
| WO | WO-2013136438 | A1 | * | 9/2013 | B60R 19/48 |
| WO | WO-2014162475 | A1 | * | 10/2014 | B60R 19/48 |
| WO | WO 2022263143 | A1 | | 12/2022 | |

* cited by examiner

BUMPER BODY-PART ASSEMBLY AND A MOTOR VEHICLE

CROSS REFERENCE TO RELATED APPLICATIONS

This application claims benefit to German Patent Application No. DE 10 2022 128 735.1, filed on Oct. 28, 2022, which is hereby incorporated by reference herein.

FIELD

The invention relates to a bumper body-part assembly. The invention also relates to a motor vehicle with such a bumper body-part assembly.

BACKGROUND

Bumper body-part assemblies are sufficiently known from the prior art as rear-part assemblies or bow-part assemblies. In this case, the bumper members serve to absorb or at least substantially reduce a force effect on the body-part behind them during a collision in order to keep the consequences for the body part as low as possible. In this case, a cavity is provided between the bumper member and the body part arranged behind it, the cavity enabling the bumper member to deform toward the body part during impact and to thereby avoid or at least reduce damage to the body part. The increasing use of electric or hybrid cars necessitates the mandatory installation of so-called sound generators, which are to impart a certain "sound" to the silent electric cars, which makes the motor vehicles audible to pedestrians. An example of such an installation of a sound generator in the cavity between the bumper member and the body part is shown in published American patent application US 2017/010678 A1. The speaker and the electronic assembly of the sound generator assembly are partially arranged in the cavity between the bumper member and the body part. Hardly deformable parts, such as the speaker or the electronic assembly, can jam between the bumper member and the body part during a collision and, in this way, pass the impact energy acting on the bumper member directly to the body part, which is thereby damaged or even destroyed.

SUMMARY

In an embodiment, the present disclosure provides a bumper body-part assembly, comprising a cavity at least partially enclosed by a bumper member and a body part and a sound generator assembly at least partially arranged in the cavity. The sound generator assembly comprises a housing assembly with at least one speaker, an electronic assembly and a fastener. The housing assembly comprises a deformation assembly arranged in the cavity.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
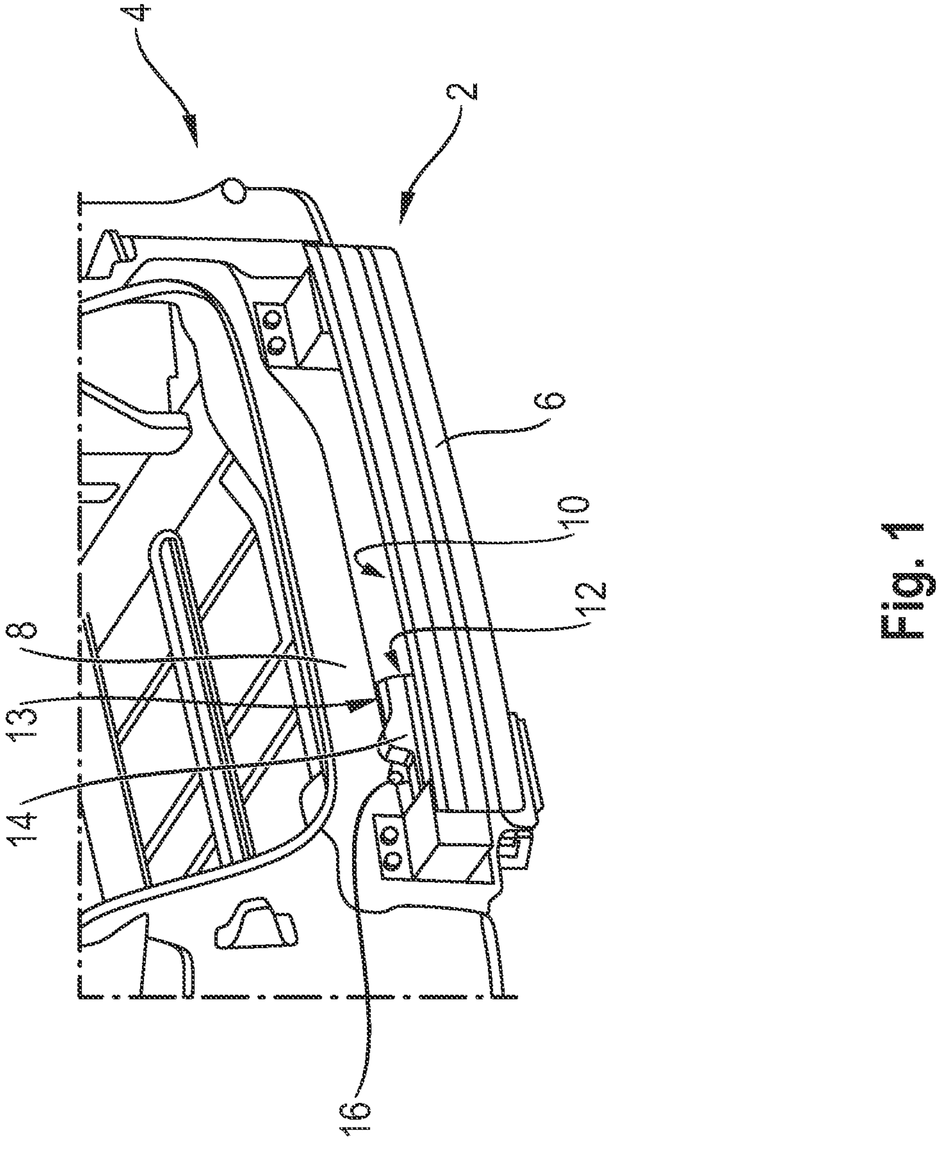
FIG. 1 illustrates a perspective view of a rear-part assembly of a tube body of a motor vehicle.

In an embodiment, the present invention avoids the aforementioned disadvantages of known assemblies in a simple and cost-effective manner.

In an embodiment, a bumper body-part assembly is provided with a cavity at least partially enclosed by a bumper member and a body part, wherein a sound generator assembly is at least partially arranged in the cavity, wherein the sound generator assembly comprises a housing assembly with at least one speaker, an electronic assembly and fastening means.

According to an embodiment of the invention, a housing assembly is provided, which has a deformation assembly which is arranged in the cavity. As a result, the housing assembly of the sound generator assembly can be deformed during a collision and thus contributes to the protection of the body part.

In an advantageous manner, the deformation assembly comprises at least two deformation bodies that can be moved relative to one another in the longitudinal motor vehicle direction, whereby the overall height of the deformation body can be reduced. In this case, the deformation bodies can be designed to be displaced into one another or folded relative to one another. To this end, hinge edges or folding edges can, for example, be provided between the deformation bodies. In addition, the deformation bodies can have ribs for directed introduction of force. It is also advantageous if a predetermined break line is provided between the first and the second deformation body. In particular, this predetermined break line can be designed in a V-shape with V-shaped geometries provided staggered.

Advantageously, at least the first deformation body directed toward the body part can be designed as a cavity and thus form a resonance volume. As a result, in addition to the deformation function, the deformation body also has the task of amplifying the sound output by the sound generator. In this case, the second deformation body can also be designed as a cavity, wherein the cavities are connected to one another. This makes it possible in a simple manner to increase the resonance volume.

In an advantageous manner, the first deformation body comprises a flange region with the fastening means in order to arrange the sound generator assembly on the respective body part.

In an advantageous embodiment, the flange region comprises a receiving means for the at least one speaker and the electronic assembly on a surface directed toward the motor vehicle underside. This makes it possible in a simple manner to provide the at least one speaker as well as the electronic assembly outside the cavity between the bumper member and the body part so that no obstruction of the deformation region can take place during a collision.

It is also advantageous if a base plate is provided between the body part and the deformation assembly. In order to increase the rigidity of the base plate, the base plate can have a honeycomb structure. In order to prevent a force component from the direction of the speaker and the electronic assembly from being transferred toward the cavity, local weakening means can be provided in the base plate in a projection of a connection region of the receiving means from the deformation assembly onto the base plate. During a collision, this also causes a "folding away" of the speaker and of the electronic assembly toward the motor vehicle underside. The receiving means with speaker and electronic assembly can be designed in such a way that the "folding away" is even intensified by links, levers and/or break edges in the receiving means. In addition, the base plate and the honeycomb structure can be adapted to the stiffness distribution of the body part by changes in geometry.

An embodiment of the invention also provides a motor vehicle with such a bumper body-part assembly, wherein the bumper body-part assembly is designed as a bow-part assembly and/or rear-part assembly.

Embodiments of the invention are explained in more detail with reference to the drawings.

FIG. 1 shows a perspective view of a bumper body-part assembly 2 according to an embodiment of the invention of a tube body 4 of a motor vehicle. The bumper body-part assembly 2 is designed as a rear-part assembly here. It comprises a bumper member 6 and a body part 8 to which the bumper member 6 is fastened. In a cavity 10, a sound generator assembly 12 with a housing assembly 13 is partially provided. This sound generator assembly 12 imparts a specific sound to the vehicle so that the motor vehicle can be perceived by a pedestrian. Reference number 14 herein denotes a flange region that is part of the housing assembly. Reference number 16 denotes an opening provided in the flange region 14 as a fastening means, through which the housing assembly 13 of the sound generator assembly 12 can be fastened to the body part 8.

Figure 2:
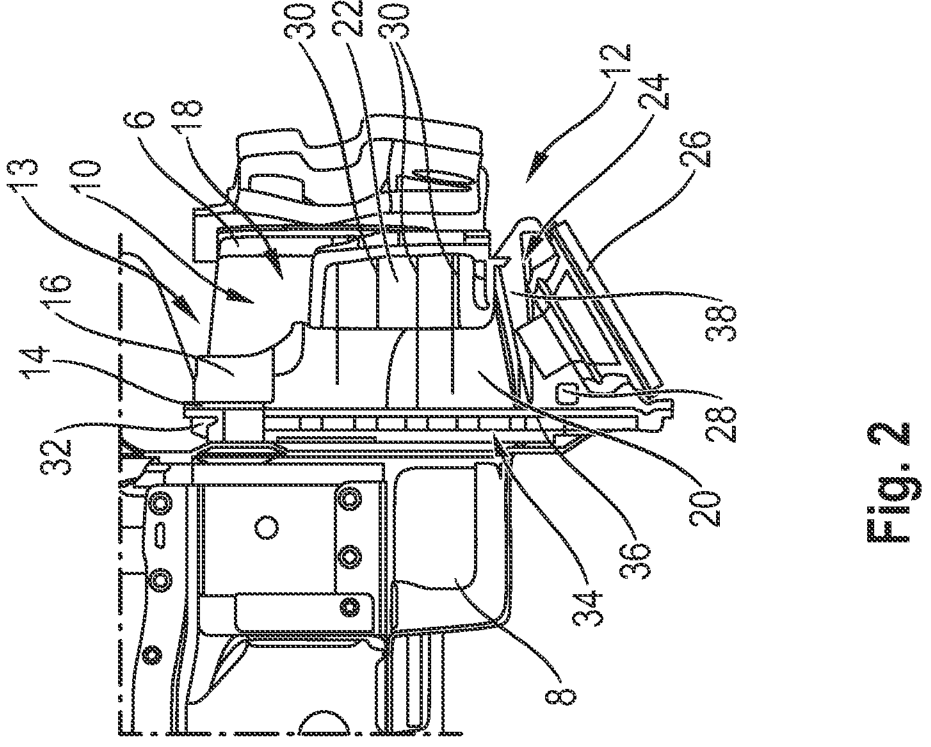
FIG. 2 illustrates a sectional view of a bumper body-part assembly according to an embodiment of the invention in the initial state.

FIG. 2 now shows a sectional view of the bumper body-part assembly 2 of FIG. 1. In order to now protect the body part 8 during a collision from an effect through the bumper member 6, the housing assembly 13 of the sound generator assembly 12 comprises a deformation assembly 18, which has a first and a second deformation body 20, 22 in the present embodiment example. Both the first and the second deformation body 20, 22 are designed as cavities, which can be slid into one another during a collision (see FIG. 3 in this respect). In addition, the interconnected cavities of the deformation bodies 20, 22 form a resonance volume for a speaker 26 arranged below the cavity 10 in a receiving means 24. The receiving means 24 is designed as part of the flange region 14. This figure only schematically shows an electronic assembly 28, which may, for example, consist of a circuit board. In order to now provide the speaker 26 and the electronic assembly 28 outside the cavity 10, the receiving means 24 is provided in a surface of the flange region 14 directed toward the motor vehicle underside.

The deformation bodies 20, 22 also have ribs 30, which are directed inward in the present embodiment example and which optimize the introduction of force into the deformation bodies 20, 22.

Also shown is a base plate 32, which has a honeycomb structure 34 in the region of the body part 8 for increasing stiffness and is provided between the deformation assembly 18 and the body part 8. This base plate 32 has a local weakening means 36 in the region of a projection of a connection region 38 of the receiving means 24, the weakening means in the present embodiment example as shown in FIG. 4 being formed by the honeycomb structure being omitted in this region.

Figure 3:
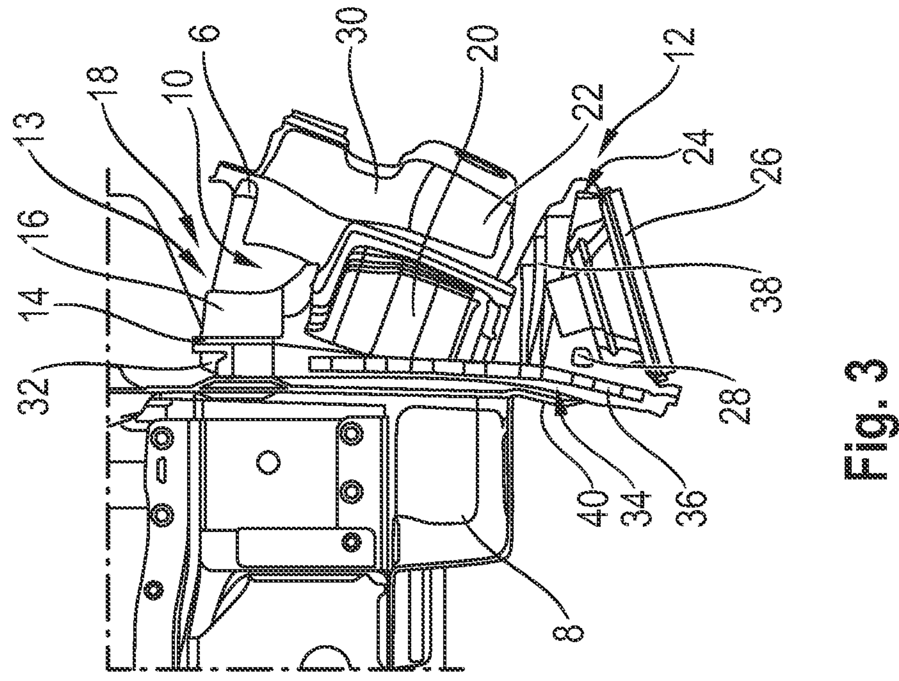
FIG. 3 illustrates a sectional view of the bumper body-part assembly according to FIG. 2 after a deformation.

FIG. 3 now shows the effect of a low-speed collision on the bumper member 6 and the bumper body-part assembly 18. The bumper member 6 was deformed at a particular angle, as a result of which the first deformation body 20 was also deformed and displaced into the deformation body 22. Due to the local weakening means 36, the receiving means 24 with the speaker 26 and the electronic assembly 28 outside the cavity 10 was folded away toward the motor vehicle underside, wherein the base plate 32 was also deformed. The body part 8 was basically not damaged. Only a sheet-metal attachment piece 40 was slightly displaced. However, in the case of a lower impact severity, this sheet-metal attachment piece 40 would also not be affected. In an alternative embodiment, it is, of course, also possible for the receiving means to freely rotate.

Figure 4:
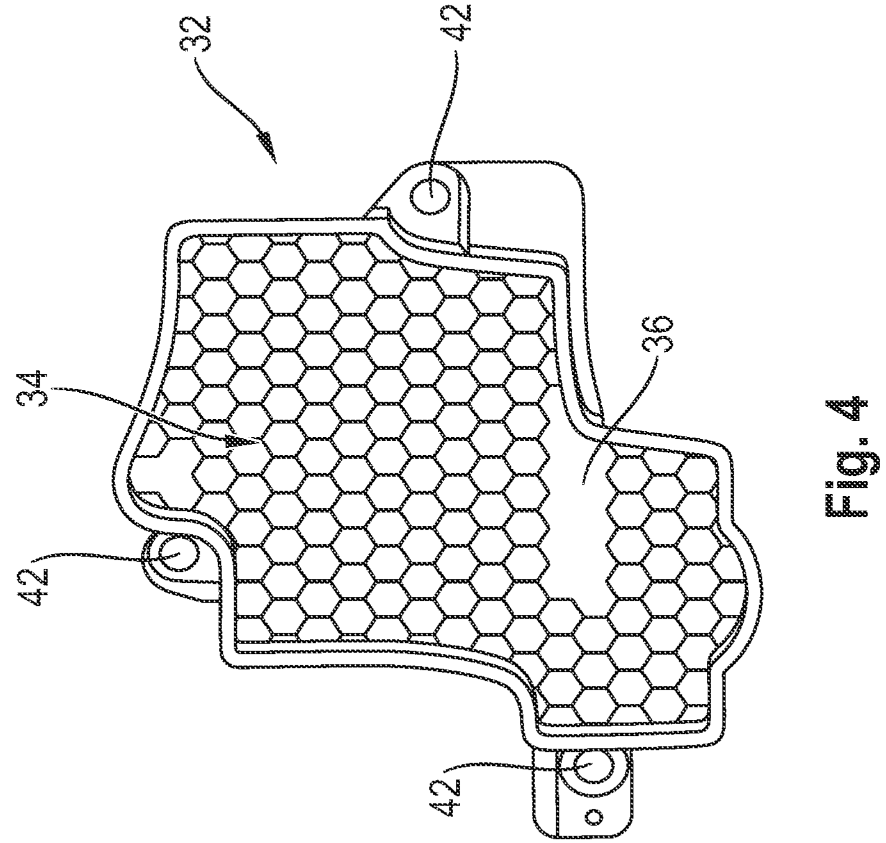
FIG. 4 illustrates a perspective view of a base plate of the bumper body-part assembly according to FIGS. 2 and 3.

FIG. 4 now shows a perspective view of the base plate 32 with the honeycomb structure 34 and the local weakening means 36, which could be formed in a simple manner by omitting the honeycomb structure. Also shown are fastening means 42 corresponding to the fastening means 16 of the flange region 14.

Figure 5:
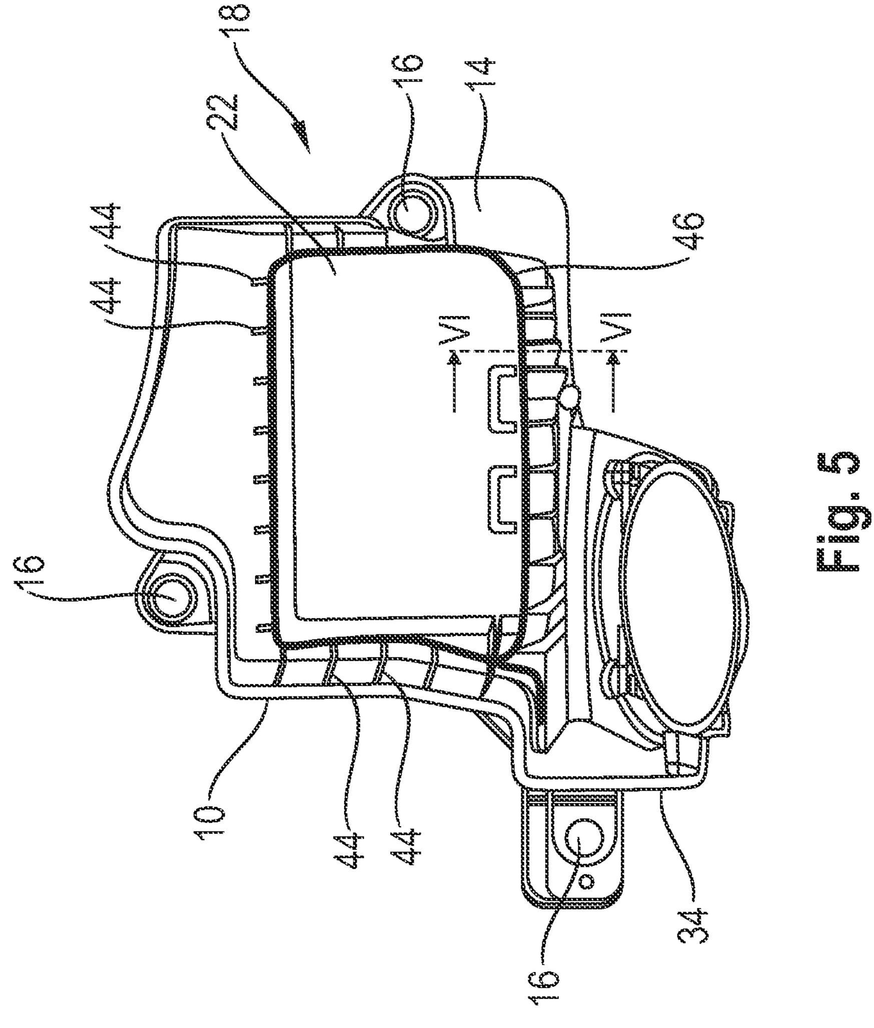
FIG. 5 illustrates a perspective view of a deformation assembly of the bumper body-part assembly.

FIG. 5 now shows a front perspective view of the deformation assembly 18. Here, the flange region 14 with the fastening means 16 and the receiving means 24 for the speaker 26 can be seen well. In addition, both the first deformation body 20 and the second deformation body 22 comprise outer ribs 44 for better introduction of force. In addition, a predetermined break line 46 is provided between the first and the second deformation body 20, 22, the predetermined break line ensuring a defined detachment of the second deformation body 22 from the first deformation body 20 during a collision and, in this way, enabling the deformation bodies 20, 22 to simply slide into one another.

Figure 6:
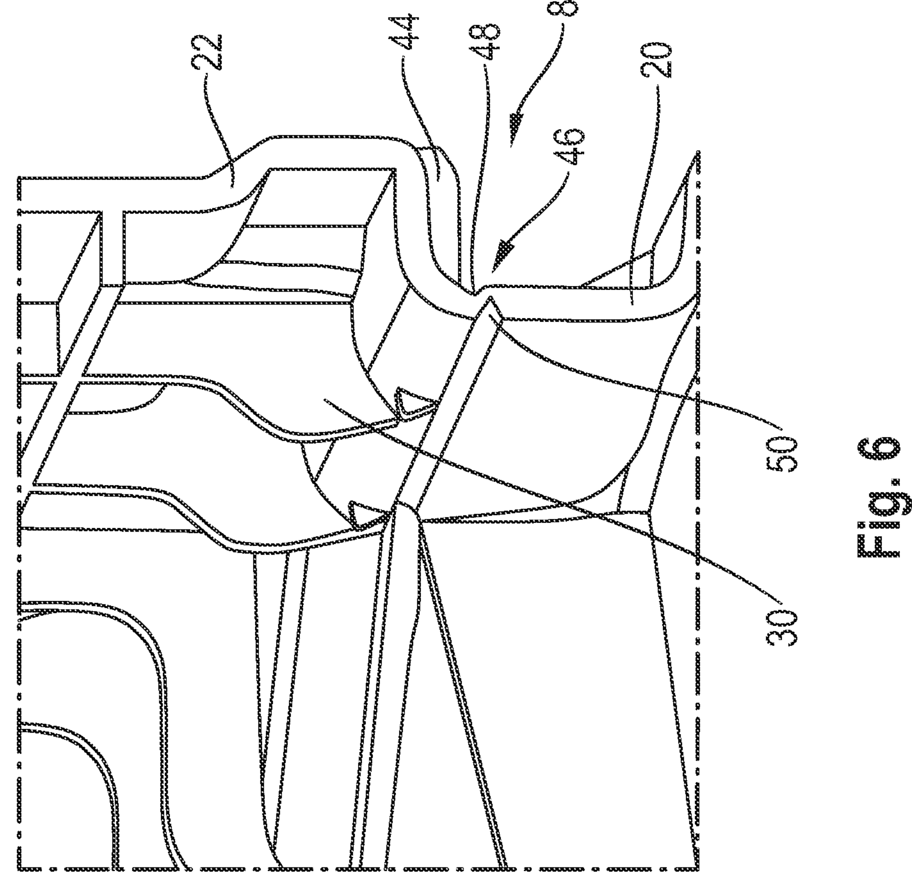
FIG. 6 illustrates a detailed view of the cavity, of the deformation assembly according to FIG. 5.

FIG. 6 shows an interior perspective view of a transition region 48 from the first deformation body 20 to the second deformation body 22. The predetermined break line 46, which has a staggered V-shape with 2 V-shaped geometries 48, 50 in the present embodiment example, can be clearly seen here. The inner ribs 30 and outer ribs 44 can also be seen.

In order to ensure reliable triggering of the deformation assembly 18, it is possible to arrange additional solid bodies between the surface of the second deformation body 22 directed toward the bumper member 6 and the bumper member 6.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A bumper body-part assembly, comprising:

a cavity at least partially enclosed by a bumper member and a body part; and a sound generator assembly at least partially arranged in the cavity, wherein the sound generator assembly comprises a housing assembly with at least one speaker, an electronic assembly and a fastener, wherein the housing assembly comprises a deformation assembly arranged in the cavity, and wherein the deformation assembly forms a cavity configured as a resonance volume for the at least one speaker.

2. The bumper body-part assembly according to claim 1, wherein the deformation assembly comprises at least two deformation bodies, which are configured to be moved relative to one another in a longitudinal motor vehicle direction, and wherein an overall height of the deformation bodies in the longitudinal motor vehicle direction are configured to be reduced.

3. The bumper body-part assembly according to claim 2, wherein the deformation bodies are configured to be displaced into one another or folded relative to one another.

4. The bumper body-part assembly according to claim 2, wherein the deformation bodies comprise ribs for directed introduction of force.

5. The bumper body-part assembly according to claim 2, wherein a predetermined break line is provided between a first and a second deformation body of the deformation bodies.

6. The bumper body-part assembly according to claim 5, wherein the predetermined break line is configured in a V-shape with V-shaped geometries provided staggered.

7. The bumper body-part assembly according to claim 5, wherein at least the first deformation body is directed toward the body part and is configured to form the cavity configured as the resonance volume.

8. The bumper body-part assembly according to claim 6, wherein the second deformation body is also configured to form the cavity configured as the resonance volume.

9. The bumper body-part assembly according to claim 5, wherein the first deformation body comprises a flange region with the fastener.

10. The bumper body-part assembly according to claim 9, wherein the flange region comprises a receiver for the at least one speaker and the electronic assembly on a surface directed toward a motor vehicle underside.

11. The bumper body-part assembly according to claim 10, wherein a base plate is provided between the body part and the deformation assembly.

12. The bumper body-part assembly according to claim 11, wherein the base plate has a honeycomb structure.

13. The bumper body-part assembly according to claim 12, wherein a local weakening means in the base plate is provided in a projection of a connection region of the receiver from the deformation assembly onto the base plate.

14. The bumper body-part assembly according to claim 12, wherein the base plate and the honeycomb structure are adapted to a stiffness distribution of the body part by changes in geometry.

15. A motor vehicle with the bumper body-part assembly according to claim 1, wherein the bumper body-part assembly is configured as a bow-part assembly and/or rear-part assembly.

16. The bumper body-part assembly according to claim 2, wherein the deformation bodies comprise a first deformation body and a second deformation body arranged sequentially in the longitudinal motor vehicle direction extending from the bumper member to the body part.

17. A bumper body-part assembly, comprising:

a cavity at least partially enclosed by a bumper member and a body part; and a sound generator assembly at least partially arranged in the cavity, wherein the sound generator assembly comprises a housing assembly with at least one speaker, an electronic assembly and a fastener, wherein the housing assembly comprises a deformation assembly arranged in the cavity, wherein the deformation assembly comprises at least two deformation bodies, which are configured to be moved relative to one another in a longitudinal motor vehicle direction, whereby an overall height of the deformation bodies in the longitudinal motor vehicle direction are configured to be reduced, and wherein a predetermined break line is provided between a first and a second deformation body of the deformation bodies.

18. The bumper body-part assembly according to claim 17, wherein the deformation bodies are configured to be displaced into one another or folded relative to one another.

19. The bumper body-part assembly according to claim 17, wherein the deformation bodies comprise ribs for directed introduction of force.

20. The bumper body-part assembly according to claim 17, wherein the first deformation body comprises a flange region with the fastener.

* * * * *